US010252820B2

(12) United States Patent
Seckel (10) Patent No.: US 10,252,820 B2
(45) Date of Patent: Apr. 9, 2019

(54) SYSTEM AND METHOD FOR STORING AIRCRAFT

(71) Applicant: HELI-ONE CANADA ULC, Richmond (CA)

(72) Inventor: Johan Seckel, Delta, CA (US)

(73) Assignee: HELI-ONE CANADA ULC, Richmond (CA)

( * ) Notice: Subject to any disclaimer, the term of this patent is extended or adjusted under 35 U.S.C. 154(b) by 0 days.

(21) Appl. No.: 15/230,005

(22) Filed: Aug. 5, 2016

(65) Prior Publication Data

US 2017/0036779 A1   Feb. 9, 2017

Related U.S. Application Data (60) Provisional application No. 62/201,847, filed on Aug. 6, 2015.

(51) Int. Cl.
| | |
|---|---|
| *B64F 1/22* | (2006.01) |
| *E04H 15/22* | (2006.01) |
| *B64F 1/00* | (2006.01) |
| *F24F 11/30* | (2018.01) |
| *E04H 6/44* | (2006.01) |
| *F24F 110/20* | (2018.01) |

(52) U.S. Cl.
CPC .............. *B64F 1/222* (2013.01); *B64F 1/005* (2013.01); *E04H 15/22* (2013.01); *F24F 11/30* (2018.01); *E04H 6/44* (2013.01); *F24F 2110/20* (2018.01)

(58) Field of Classification Search
CPC .......... E04H 15/22; E04H 6/44; B64F 1/222; B64F 1/005; F24F 11/0015; F24F 11/30; F24F 2110/20
See application file for complete search history.

(56) References Cited

U.S. PATENT DOCUMENTS

| | | | | |
|---|---|---|---|---|
| 3,335,529 | A * | 8/1967 | Gedney | E04H 15/22 |
| | | | | 52/2.14 |
| 3,783,766 | A * | 1/1974 | Boucher | B65D 88/745 |
| | | | | 150/166 |
| 4,103,369 | A * | 8/1978 | Riordan | E04H 15/22 |
| | | | | 4/499 |

(Continued)

FOREIGN PATENT DOCUMENTS

| | | | | |
|---|---|---|---|---|
| CA | 2122872 | C * | 3/2004 | ............... E04H 6/04 |
| CA | 2 229 336 | C | 7/2008 | |

(Continued)

OTHER PUBLICATIONS

Affordable Instant Structures, Inc. "Airplane Hangars," located at <http://www.portableshelters.com/airplane_hangars.htm>, accessed on Sep. 17, 2005; 7 pages.

(Continued)

*Primary Examiner* — Babajide A Demuren
(74) *Attorney, Agent, or Firm* — DLA Piper LLP (US)

(57) ABSTRACT

A system and method for storing aircraft (e.g., helicopters) in optimal humidity conditions with decreased maintenance costs is described. The aircraft is place within an inflatable storage chamber defined by a base portion and an upper portion. Once the base and upper portions are secured to each other, the chamber is inflated, and a telemetry system is disposed within the chamber to monitor and control humidity and temperature.

21 Claims, 12 Drawing Sheets

(56) References Cited

U.S. PATENT DOCUMENTS

| | | | |
|---|---|---|---|
| 4,118,209 A * | 10/1978 | Exler | F24F 3/1405 165/249 |
| 4,280,804 A * | 7/1981 | Holland | B29C 43/3607 264/316 |
| 4,911,317 A | 3/1990 | Schloesser et al. | |
| 4,991,363 A * | 2/1991 | Randmae | E04H 6/04 135/88.06 |
| 5,566,512 A | 10/1996 | Page | |
| 5,966,877 A | 10/1999 | Hawes | |
| 6,109,872 A | 8/2000 | McCausland | |
| 6,119,408 A | 9/2000 | Page | |
| 6,266,927 B1 * | 7/2001 | Leslie | E04H 15/22 52/2.17 |
| 6,361,276 B1 | 3/2002 | Beachum et al. | |
| 6,438,900 B1 | 8/2002 | Page | |
| 6,444,595 B1 | 9/2002 | Elkouh et al. | |
| 6,794,317 B2 | 9/2004 | Elkouh et al. | |
| 6,833,334 B1 | 12/2004 | Elkouh et al. | |
| 6,835,045 B1 | 12/2004 | Barbee et al. | |
| 6,858,054 B2 | 2/2005 | Page | |
| 6,875,119 B2 * | 4/2005 | Murphy | E04H 15/22 472/134 |
| 7,053,012 B2 | 5/2006 | Elkouh et al. | |
| 7,183,230 B2 | 2/2007 | Elkouh et al. | |
| 7,478,862 B2 * | 1/2009 | Wiegel | B60J 11/02 296/98 |
| 7,759,265 B2 | 7/2010 | Elkouh et al. | |
| 8,021,737 B2 | 9/2011 | Elkouh et al. | |
| 8,336,807 B2 | 12/2012 | Hanafin et al. | |
| 8,479,452 B2 | 7/2013 | Page | |
| 8,499,533 B2 | 8/2013 | Emond et al. | |
| 8,580,369 B2 | 11/2013 | Emond et al. | |
| 2004/0074530 A1 * | 4/2004 | Page | A61L 9/16 135/93 |
| 2008/0047596 A1 | 2/2008 | King et al. | |
| 2010/0281154 A1 * | 11/2010 | Bedi | G06F 11/3476 709/224 |
| 2013/0294002 A1 | 11/2013 | Thompson et al. | |
| 2013/0318925 A1 | 12/2013 | Emond et al. | |
| 2014/0138281 A1 | 5/2014 | Emond et al. | |
| 2015/0114439 A1 | 4/2015 | Henderson et al. | |

FOREIGN PATENT DOCUMENTS

| | | |
|---|---|---|
| CA | 2 866 561 A1 | 1/2009 |
| CA | 2 426 370 C | 4/2010 |
| CA | 2 488 164 C | 5/2012 |
| CA | 2 661 295 C | 12/2012 |
| CA | 2 736 635 C | 3/2013 |
| CA | 2 736 671 C | 8/2013 |
| CA | 2 693 584 C | 12/2014 |
| DE | 20 2006 000 472 U1 | 5/2006 |
| WO | 99/35054 A1 | 7/1999 |
| WO | 2015/059458 A1 | 4/2015 |

OTHER PUBLICATIONS

J. B. Roche (MFG) Ltd. "Standard Inflatable Shelters," located at <http://www.jbroche.com/aircraft-shelters/standard>, accessed on Sep. 17, 2005; 4 pages.

US Cover, LLC. "Control Dry Storage™ Systems," located at <http://www.uscover.com/dry.htm>, accessed on Sep. 17, 2015; 2 pages.

* cited by examiner

SYSTEM AND METHOD FOR STORING AIRCRAFT

CROSS REFERENCE TO RELATED APPLICATIONS

This application claims priority to U.S. Provisional Patent Application No. 62/201,847, filed Aug. 6, 2015, the entire contents of which are incorporated by reference, as if fully set forth herein.

FIELD OF THE INVENTION

The present invention generally relates to a system and method for storing helicopters, and more specifically, to a system and method for storing helicopters in optimal conditions with decreased maintenance costs.

BACKGROUND OF THE INVENTION

Valuable items such as motor vehicles and aircraft will deteriorate if not stored in dry, non-humid conditions. Humid conditions often cause condensation, which results in rust. Drape or inflatable coverings may be used to stem deterioration and rust in both motor vehicles and aircraft, but they are not a complete solution.

Inflatable shelters and inflatable coverings have existed for some time. In fact, there presently exist several inflatable coverings for vehicles of various types. However, the does not presently exist an inflatable covering for helicopters which meets the somewhat rigorous requirements of storage set forth by the Federal Aviation Administration (FAA), and similar regulatory bodies.

For example, U.S. Pat. No. 5,566,512 (the entire contents of which are hereby incorporated by reference) describes an inflatable storage chamber for motor vehicles which may be inflated by means of an external fan. Similarly, U.S. Pat. No. 6,438,900 (the entire contents of which are hereby incorporated by reference) discloses a protective cover for vehicles with integrated fans used for inflation. U.S. Pat. Nos. 6,119, 408 and 6,858,054, both of which are hereby incorporated by reference, teach similar concepts. German Patent Application DE 20 2006 000472 U1 discloses an inflatable plastic tent for motor vehicles. Canadian Patent CA 2229336C discloses an inflatable storage chamber for motor vehicle storage; Canadian Patent CA 2426370C discloses an inflatable storage chamber with a fan to keep air flowing through the chamber.

In the field of helicopter storage specifically, there are some known systems for storing helicopters in bags or coverings. PCT Application PCT/IT98/00381 (published as WO 99/35054), for example, teaches a method for storing helicopters in a textile bag, and blowing inert gas such as Nitrogen into the bag to prevent corrosion over time. U.S. App. 2013/0294002 A1 discloses a protective cover for aircraft which permits humidity to escape by its construction.

However, the prior art does not disclose or suggest a method for storing helicopters where the humidity inside of an inflatable covering is precisely monitored and controlled.

The present invention aims to solve the drawbacks of the prior art through a system and method for actively monitoring and controlling the humidity levels around an aircraft (e.g., helicopter). The present invention utilizes dehumidifiers disposed within the covering, and related monitoring equipment, to continuously monitor the humidity levels inside the covering, and provide alerts when those humidity levels increase above, or fall below, accepted levels.

SUMMARY OF THE INVENTION

An exemplary embodiment of the present invention comprises an aircraft storage system including a base portion, an upper portion which may be attached to the base portion to form a substantially sealed chamber in which an aircraft may be disposed, at least one dehumidifier disposed within the substantially sealed chamber, and a telemetry system for monitoring atmospheric conditions both inside and outside the substantially sealed chamber.

An exemplary embodiment of the present invention also comprises a method for controlling atmospheric conditions around an aircraft, including the steps of disposing the aircraft on a base portion of a storage chamber, disposing at least one dehumidifier on the base portion near the aircraft, disposing a telemetry system near the aircraft, disposing an upper portion of the storage chamber overtop of the aircraft, securing the base portion to the upper portion to form a substantially sealed chamber surrounding the aircraft, inflating the substantially sealed chamber; and monitoring the relative humidity (rH) around the aircraft using the telemetry system, and modifying the output of the at least one dehumidifier based on the measured relative humidity (rH), so as to maintain a specific relative humidity (rH) level within the substantially sealed chamber surrounding the aircraft.

BRIEF DESCRIPTION OF THE DRAWINGS

The invention will be better understood with reference to the following detailed description, of which the following drawings form an integral part.

DETAILED DESCRIPTION

The present invention relates to a system and method for storing aircraft (e.g., helicopters) in conditions which substantially lower maintenance costs. The system and method involves storing a helicopter within a storage unit or 'pod' (comprised of a large inflatable covering), and monitoring the conditions inside the pod so as to maintain a preferred atmosphere, specifically a preferred relative humidity (rH) level.

Humidity is one of the main factors impacting helicopter performance often, helicopters are stored in hangars where the ambient air has a significant amount of moisture (i.e., high humidity areas). This moisture negatively impacts the some of the operating parts of the helicopter after exposure for long periods of time. Thus, routine checkups and maintenance are required to make sure that helicopters are 'flight ready.' These routine checkups and maintenance can be expensive on a yearly basis, and require scheduling.

The present invention seeks to solve these issues by providing a system and method for storing a helicopter where an optimal humidity environment is maintained between flights, thus significantly reducing (and possibly eliminating) the need for routine checkups and maintenance.

A system and method according to an exemplary embodiment of the present invention involves setting up a Controlled Humidity Environment (CHE). Storage of an aircraft (e.g., helicopter) in a CHE has advantages with respect to calendar-based maintenance activities on the airframe and specific components.

The CHE is formed by three primary components: (1) a storage unit (referred to herein as a 'pod'), (2) one or more dehumidifiers, and (3) a telemetry system. The dehumidifiers may comprise, for example, RM85D 115/230Vac dehumidifiers made by Ebac Industrial Products Ltd. (http://www.eipl.co.uk). In addition to the pod, dehumidifiers and telemetry system, the CHE system may also include a water drain hose and fittings (for routing water removed from the air by the dehumidifiers), and blade storage racks for storing removed helicopter blades.

The pod may include an integrated fan system which helps to inflate the pod. This fan system may be powered by a standard electrical cable which is attached to the pod.

The telemetry system may include: (1) a first data logger for logging temperature and relative humidity (rH) data, (2) a second data logger for logging temperature and differential pressure data, and (3) a wireless device server which serve to connect the first and second data loggers to a private network (referred to herein as the "CHC Citrix network"). The first data logger monitors rH inside the pod, and the second data logger monitors differential pressure between the outside and inside of the pod. The telemetry system may also include software stored on one or more personal computers (PCs) which allows users to access the private network, and download data from the data loggers through the wireless device server. For example, the TrendReader® software sold by ACR Systems ("ACR") (http://www.acr-systems.com/) may be used in conjunction with an ACR Wireless Device Server to create a secure connection to the data loggers.

Additional items which may also be of assistance in setting up a CHE include: (1) packing material (such as bubble wrap) for the rotor head and antennas to prevent tearing of the pod material during setup, (2) ladders, (3) electrical extension cords, (4) ropes or heavy twine, (5) 10 ft (3 m) pole(s) with a blunt end that does not damage pod material, and (6) an electric blower fan to speed inflation of the pod.

Figure 1:
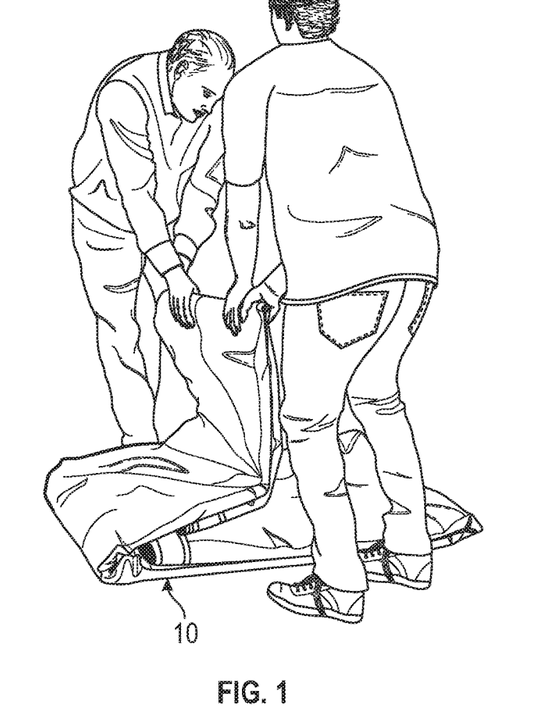
FIG. 1 is a perspective view of a base portion of an inflatable storage pod according to an exemplary embodiment of the present invention, partially unfolded.
Figure 2:
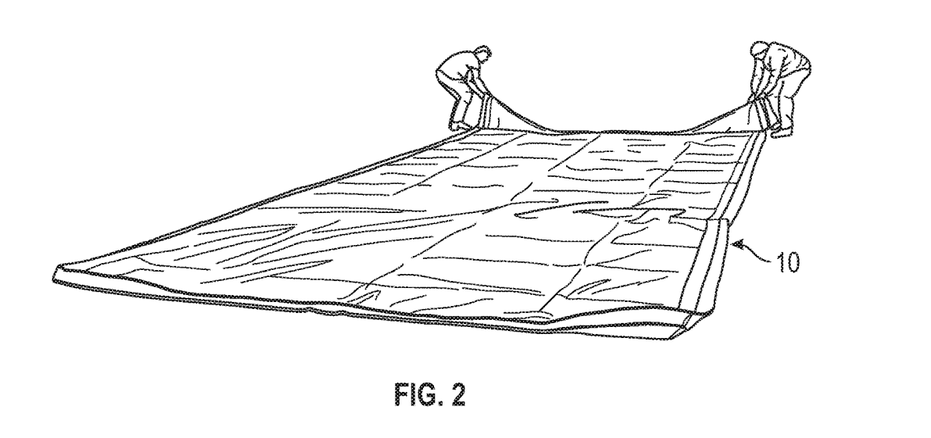
FIG. 2 is a perspective view of a base portion of an inflatable storage pod according to an exemplary embodiment of the present invention, completely unfolded.
Figure 3:
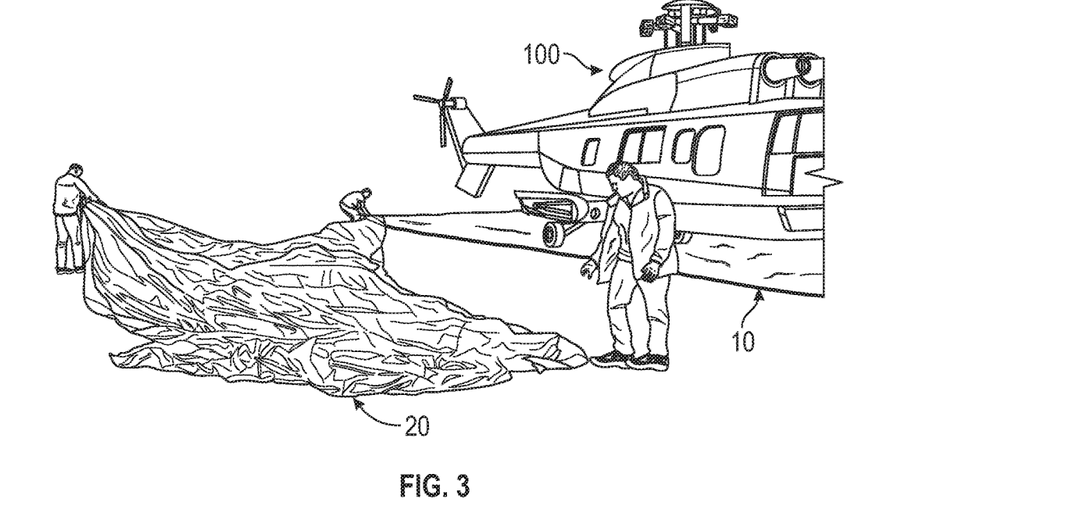
FIG. 3 is a perspective view of an upper portion of an inflatable storage pod according to an exemplary embodiment of the present invention.
Figure 4:
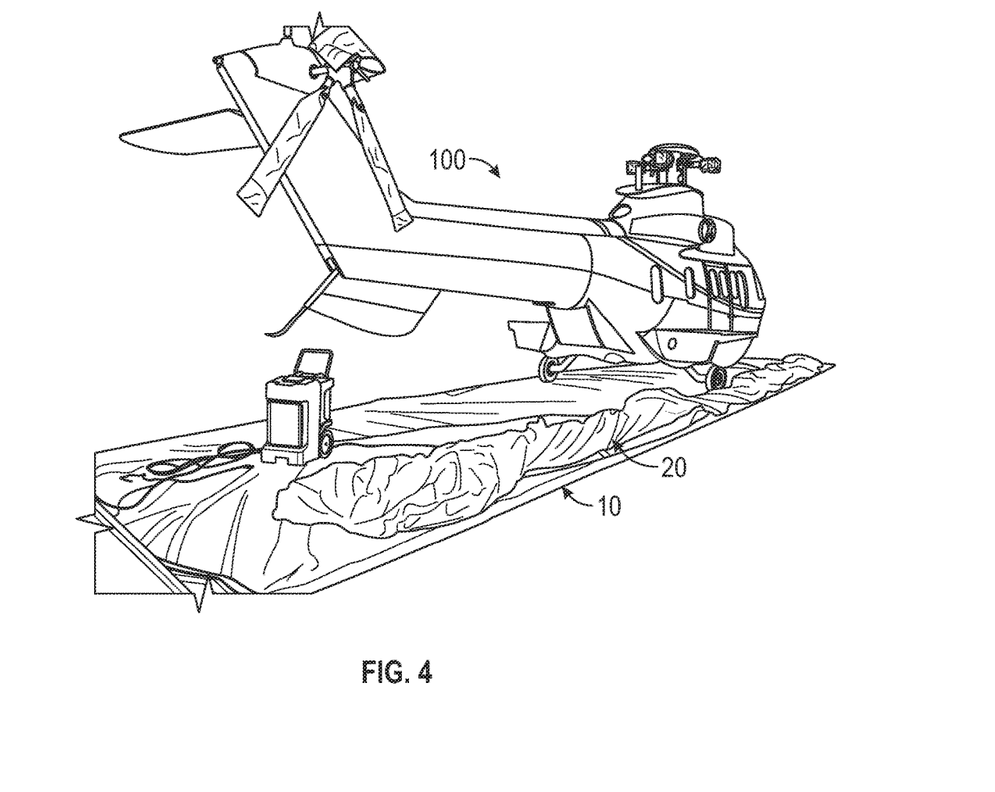
FIG. 4 is a perspective view of a base portion and an upper portion of an inflatable storage pod according to an exemplary embodiment of the present invention, disposed around an aircraft.

An exemplary method for setting up a CHE will now be described with reference to the drawings. FIG. 1 shows a first stage of the process where a base section 10 of an inflatable storage pod is unfolded and laid out on the floor of an aircraft hangar, or other large open space. FIG. 2 shows the base section 10 completely unfolded. The inflatable storage pod also includes an upper section 20, which serves to cover the top portion of the aircraft. FIG. 3 shows the upper section 20 being laid out on the ground, and FIG. 4 shows the upper section placed next to the aircraft 100 on top of the base section 10. The base section may comprise a heavy, vinyl-like material, whereas the upper section 20 may comprise a lightweight, fabric-like material.

Figure 12:
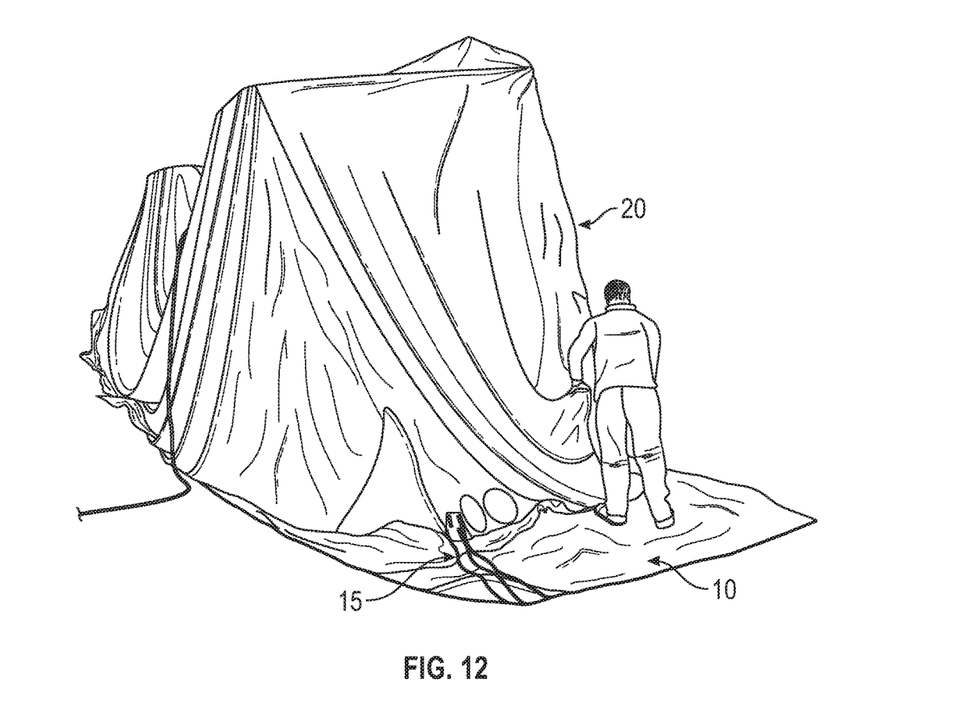
FIG. 12 is a perspective view of a base portion and an upper portion of an inflatable storage pod according to an exemplary embodiment of the present invention, showing a pass through whip.

A portion of the base section 10 may include a 'pass through whip' (i.e., opening) and the first part of a zipper (not shown). FIG. 12 shows an exemplary pass through whip 15 in the base portion 10. A portion of the upper section 20 may include airlock, and a second part of a zipper. The first and second portions of the zipper may cooperate to seal the base section 10 to the upper portion 20, as will be understood by those of ordinary skill in the art.

For storage purposes, the following items may be positioned on the base section 10 before any zippering or inflation occurs: (a) one or more dehumidifiers, (b) blade storage racks, and (c) any other large items to be stored. Once inflated, only items that fit into the airlock of the upper section 20 can be placed in (or removed from) the pod without risk of deflation and introduction of moist air. However, the dehumidifiers can be moved through the airlock.

Figure 5:
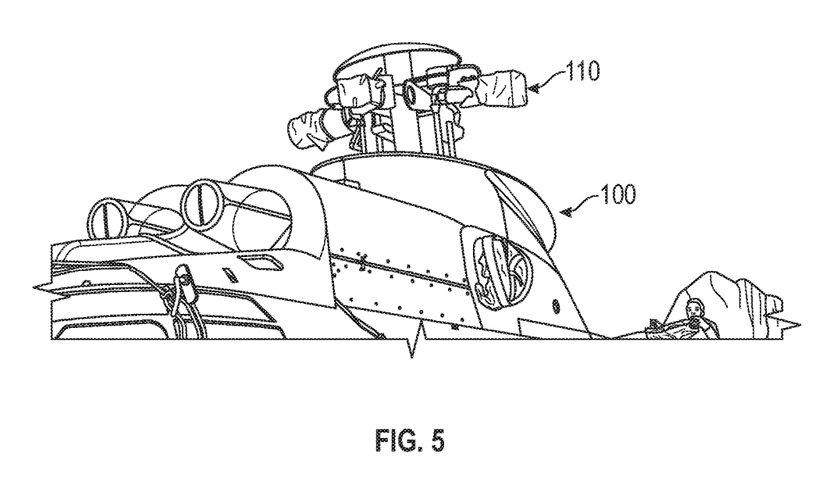
FIG. 5 is a perspective view of a rotor of an aircraft according to an exemplary embodiment of the present invention.
Figure 6:
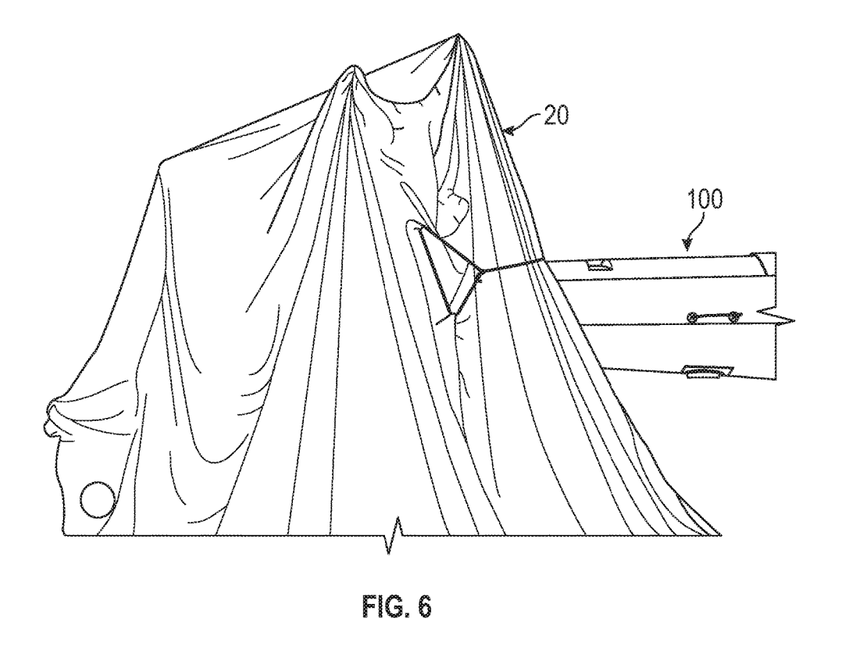
FIG. 6 is a perspective view of an upper portion of an inflatable storage pod according to an exemplary embodiment of the present invention, covering a tail section of an aircraft.

FIG. 5 shows the next step in the method, which is removing the rotor blades and wrapping the rotor head fittings 110 with bubble wrap to protect the pod during inflation. Any antennae on the aircraft may be wrapped with bubble wrap as well to protect both the antennae, and the pod, during inflation. Once the antennae and rotor head fittings have been protected, the upper portion 20 may be slowly placed over the aircraft 100, beginning with the tail portion of the aircraft. For example, one person on a ladder may be inside the pod pulling the material of the upper portion 20 over the tail rotor, and a second person may at the same time be pulling the material of the upper portion carefully down over the other side of the tail rotor. FIG. 6 shows the upper portion 20 covering a portion of the tail of the aircraft 100. As the material of the upper portion 20 is draped over the rest of the aircraft 100, it may be advisable to position a person near the rotor head fittings 110 who can pass the material of the upper portion carefully over the rotor head fittings.

Figure 7:
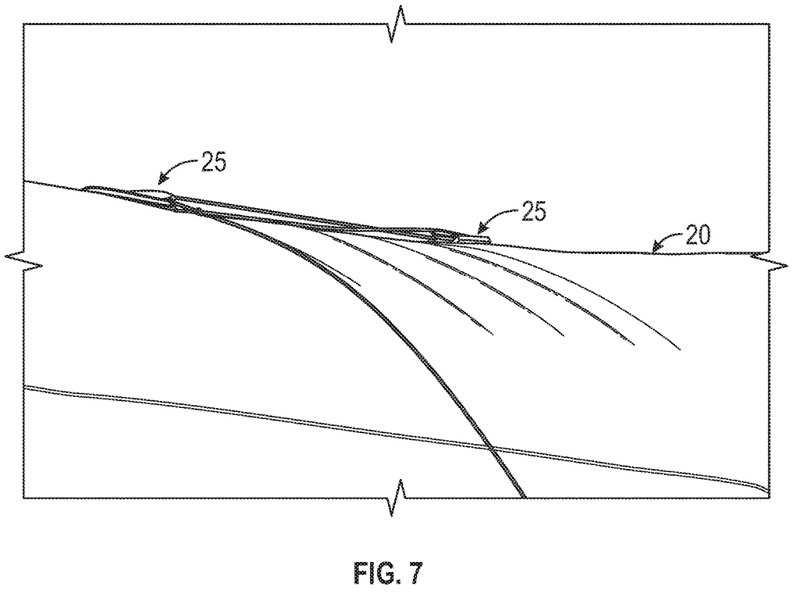
FIG. 7 is a perspective view of an upper portion of an inflatable storage pod according to an exemplary embodiment of the present invention, showing eyelets in the upper portion.
Figure 8:
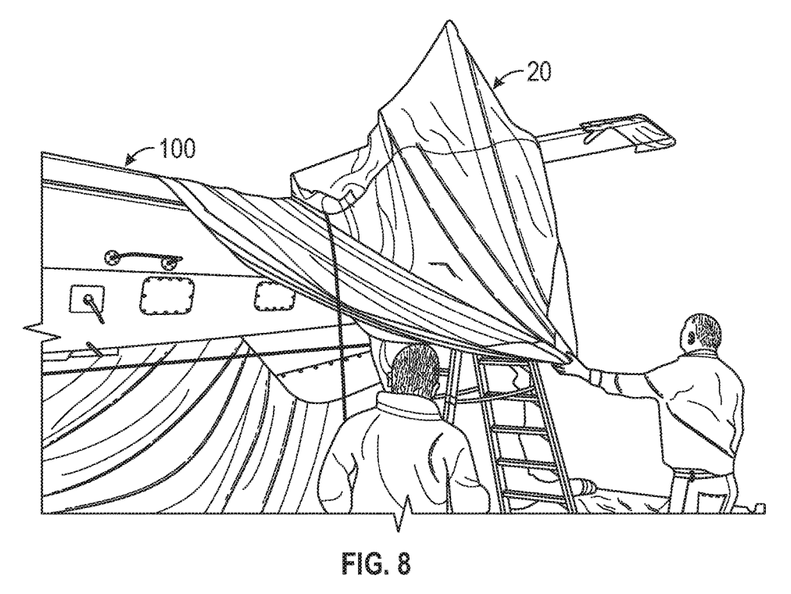
FIG. 8 is a perspective view of an upper portion of an inflatable storage pod according to an exemplary embodiment of the present invention.
Figure 9:
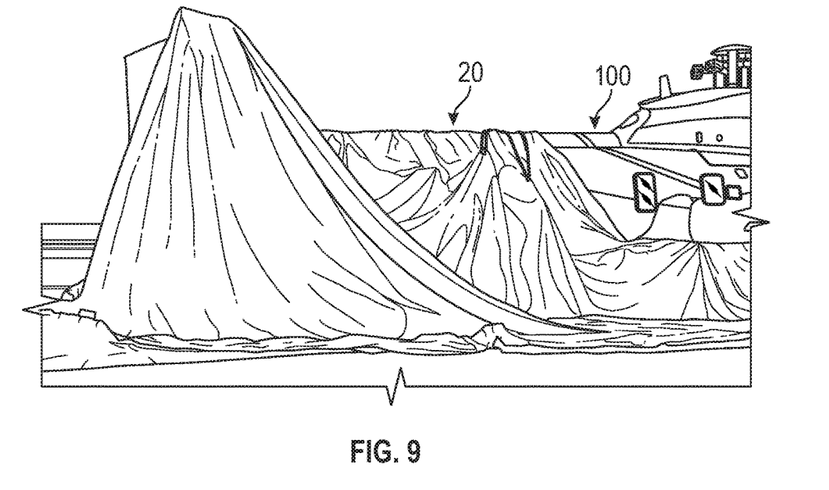
FIG. 9 is a perspective view of an upper portion of an inflatable storage pod according to an exemplary embodiment of the present invention, covering approximately half of an aircraft.
Figure 10:
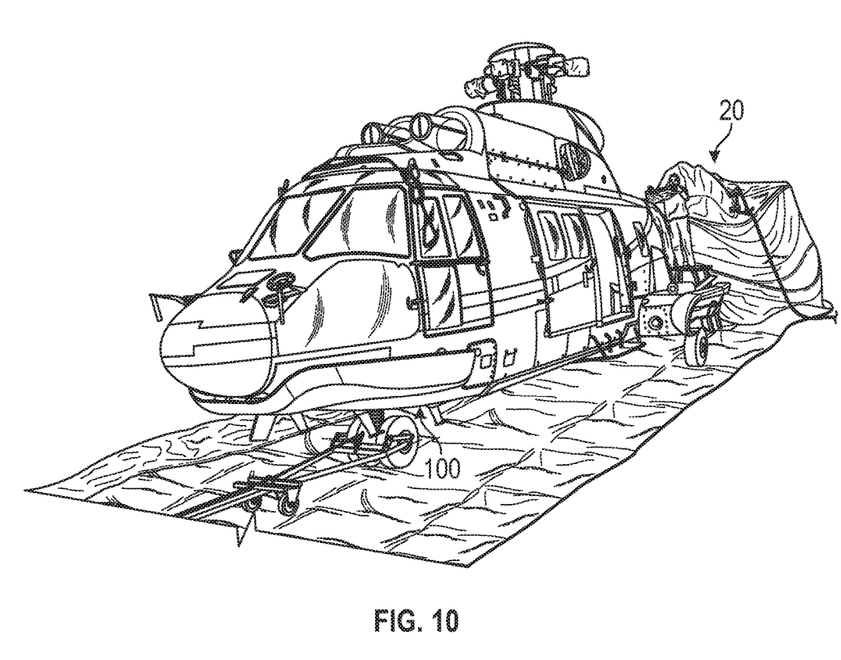
FIG. 10 is a perspective view of a base portion and an upper portion of an inflatable storage pod according to an exemplary embodiment of the present invention.
Figure 11:
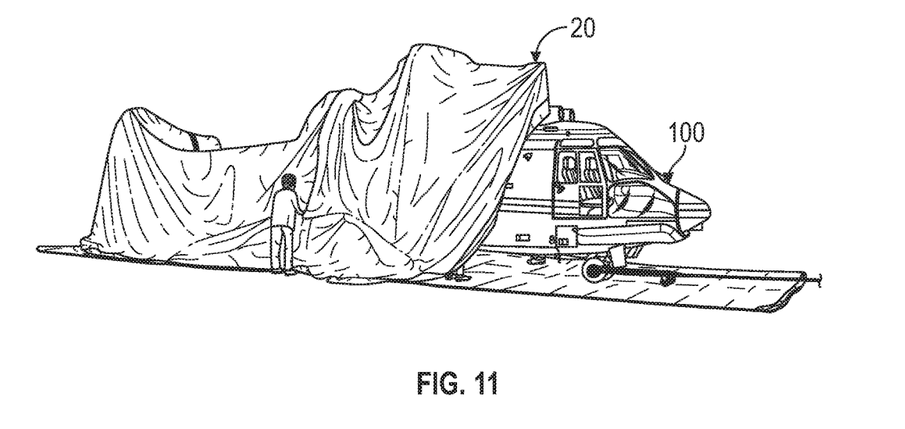
FIG. 11 is a perspective view of a base portion and an upper portion of an inflatable storage pod according to an exemplary embodiment of the present invention, covering approximately three quarters of an aircraft.

The upper section 20 may include one or more eyelets 25 (i.e., loops of material) for attaching tie downs (e.g., ropes). These eyelet 25 are shown in FIG. 7. If necessary, ropes may be placed through two or more of the eyelets 25 to assist with moving the material of the upper portion 20 over the aircraft 100. The ropes may not be suitable to pull the material, but they may assist in holding position (i.e., preventing the material from sliding off the back of the aircraft). A pole may also be useful to lift the material of the upper portion 20 over the aircraft 100. FIGS. 9-12 show various points in time as the upper portion 20 over the aircraft 100 is successively moved to cover the entire aircraft 100.

Once the upper portion 20 has been placed over the entire body of the aircraft 100 (as shown in Figure, the process of attaching the upper portion to the base portion 10 may begin. As noted above, this attachment process may be performed through a zipper which has parts on each of the base portion 10 and the upper portion 20. The zipper may be a single zipper, or multiple zippers for added security. The one or more zippers may be engaged to secure the upper section 20 to the base section 10.

Figure 13:
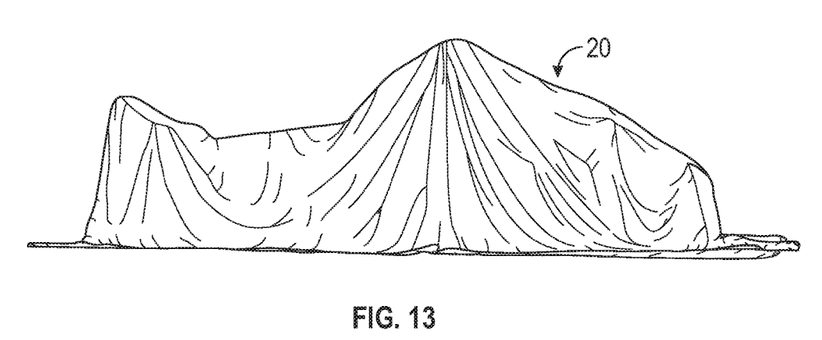
FIG. 13 is a perspective view of a base portion and an upper portion of an inflatable storage pod according to an exemplary embodiment of the present invention, covering an entire aircraft.
Figure 14:
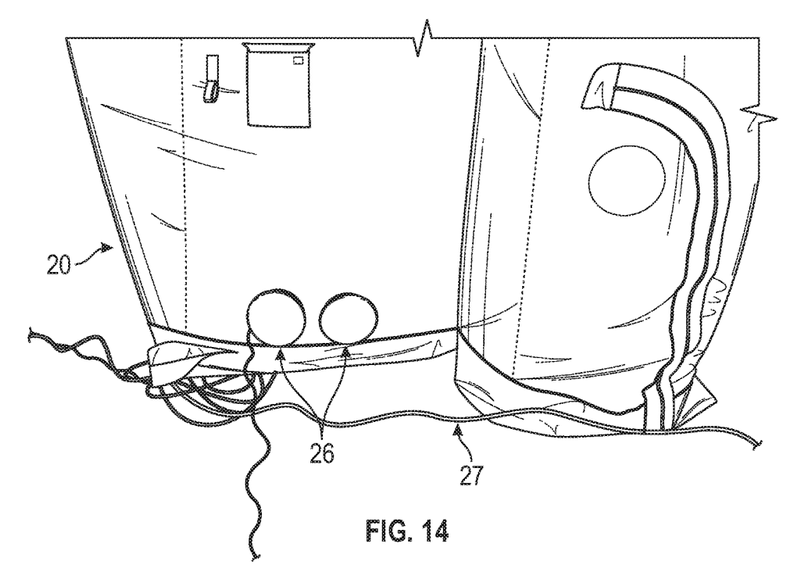
FIG. 14 is a perspective view of an upper portion of an inflatable storage pod according to an exemplary embodiment of the present invention, showing integrated fans.

Once the upper portion 20 of the pod completely covers the aircraft 100 (as shown in FIG. 13), the inflation mechanism may be activated. The inflation mechanism may comprise one or more fans 26 which are integrated into the upper portion 20 of the pod, and which are powered by a standard outlet cord 27 integral with the upper portion. In one exemplary embodiment, the upper portion may include four (4) integrated fans 26, two (2) on each side of right and left sides of the upper portion. FIG. 14 shows such an exemplary embodiment, where the two left hand (LH) integrated fans 26, and cord 27 are shown. Using such a four-fan system, it may take up to one (1) hour or more to fully inflate the pod. IF a faster inflation is desired, the process can be accelerated by using a portable electric blower fan.

Figure 15:
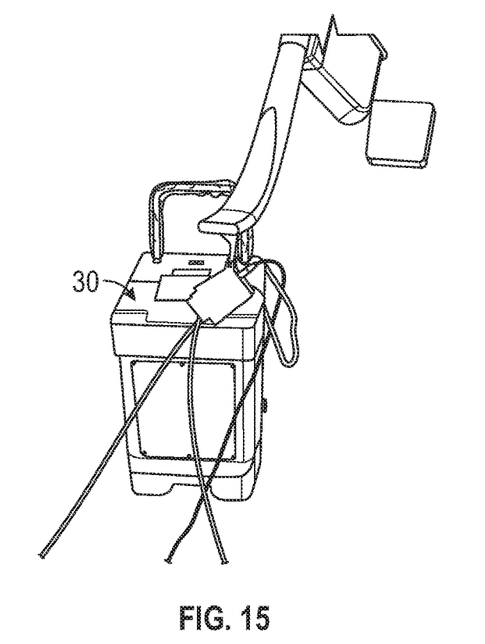
FIG. 15 is a perspective view of a dehumidifier according to an exemplary embodiment of the present invention.

Once the pod is fully inflated, the previously mentioned dehumidifiers may be disposed strategically within the pod. In one exemplary embodiment, two (2) dehumidifiers 30 may be used, where one is placed at the rear corner of the pod (blowing forward towards he aircraft), and one is place in the diagonally opposite front corner of the pod (blowing backward towards the aircraft). An exemplary dehumidifier 30 is shown in FIG. 15. It is easier to place the dehumidifiers 30 on the base portion 10 prior to installing the upper portion 20. However, the dehumidifiers 30 can also be placed through the air lock in the upper portion 20 after inflation.

Figure 16:
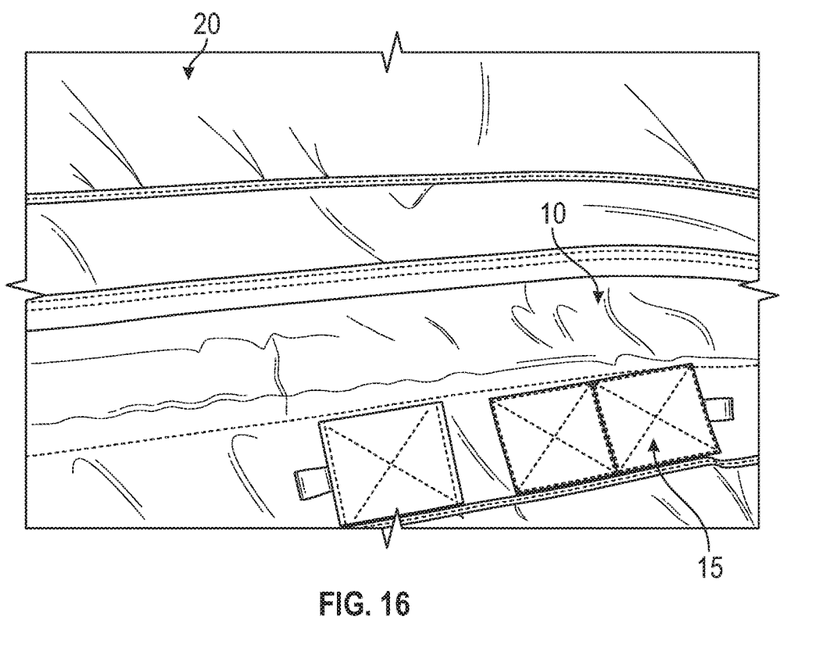
FIG. 16 is a detailed perspective view of a base portion and an upper portion of an inflatable storage pod according to an exemplary embodiment of the present invention, showing a pass through whip from inside the pod.
Figure 17:
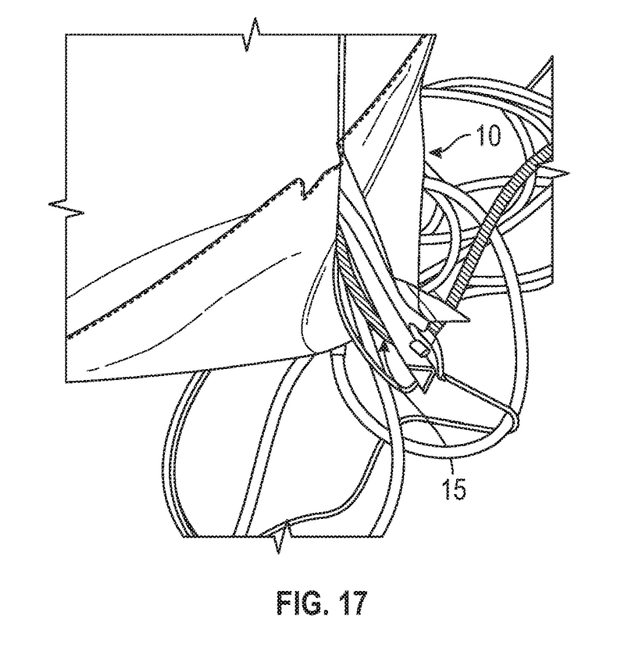
FIG. 17 is a detailed perspective view of a base portion and an upper portion of an inflatable storage pod according to an exemplary embodiment of the present invention, showing a pass through whip from outside the pod.
Figure 18:
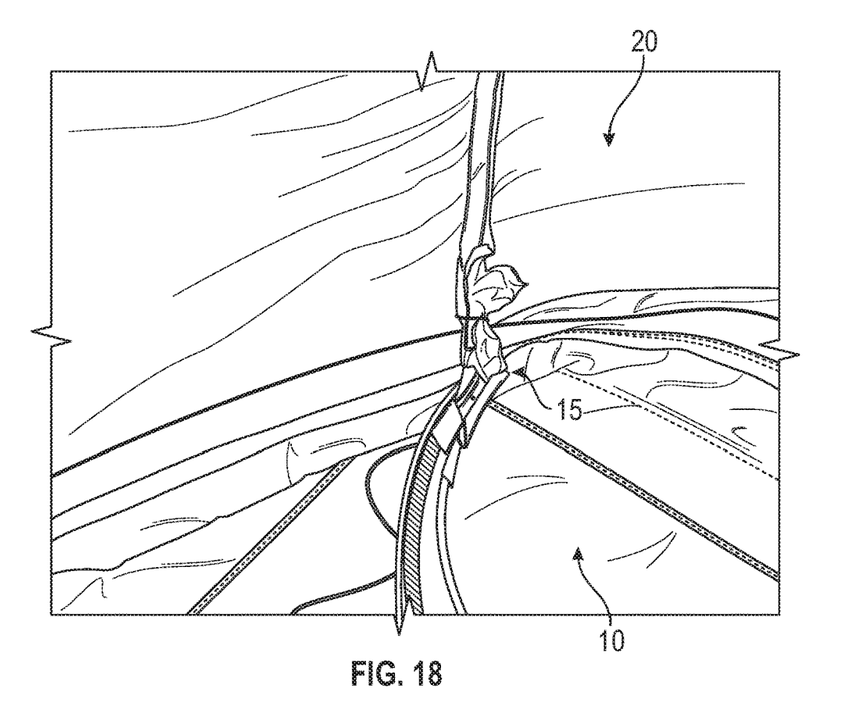
FIG. 18 is a detailed perspective view of a base portion and an upper portion of an inflatable storage pod according to an exemplary embodiment of the present invention, showing a pass through whip from inside the pod, along with hoses and wires.

After inflation of the pod and placement of the dehumidifiers 30, and wires, cables or hoses internal to the pod may be moved to the outside of the pod through a pass through whip 15 in the base portion 10, which is disposed close to the zipper attaching the upper portion 20 to the base portion, as shown in FIGS. 16 and 17. FIG. 16 shows the pass through whip 15 from inside the pod, and FIG. 17 shows the pass through whip from outside the pod. As an example, power cord(s), water drain line(s) for the dehumidifiers 30, and telemetry pressure sensing line(s) for the dehumidifiers 30 may be fed through the pass through whip 15. FIG. 18 shows another view of the pass through whip 15 inside the pod, with exemplary lines such as a water drain line, a power line, a pressure sensing line, and a data logging line. The data logging line may be a computer line (e.g., Ethernet cable) that connects the telemetry system 200 described below to a computer.

Figure 19:
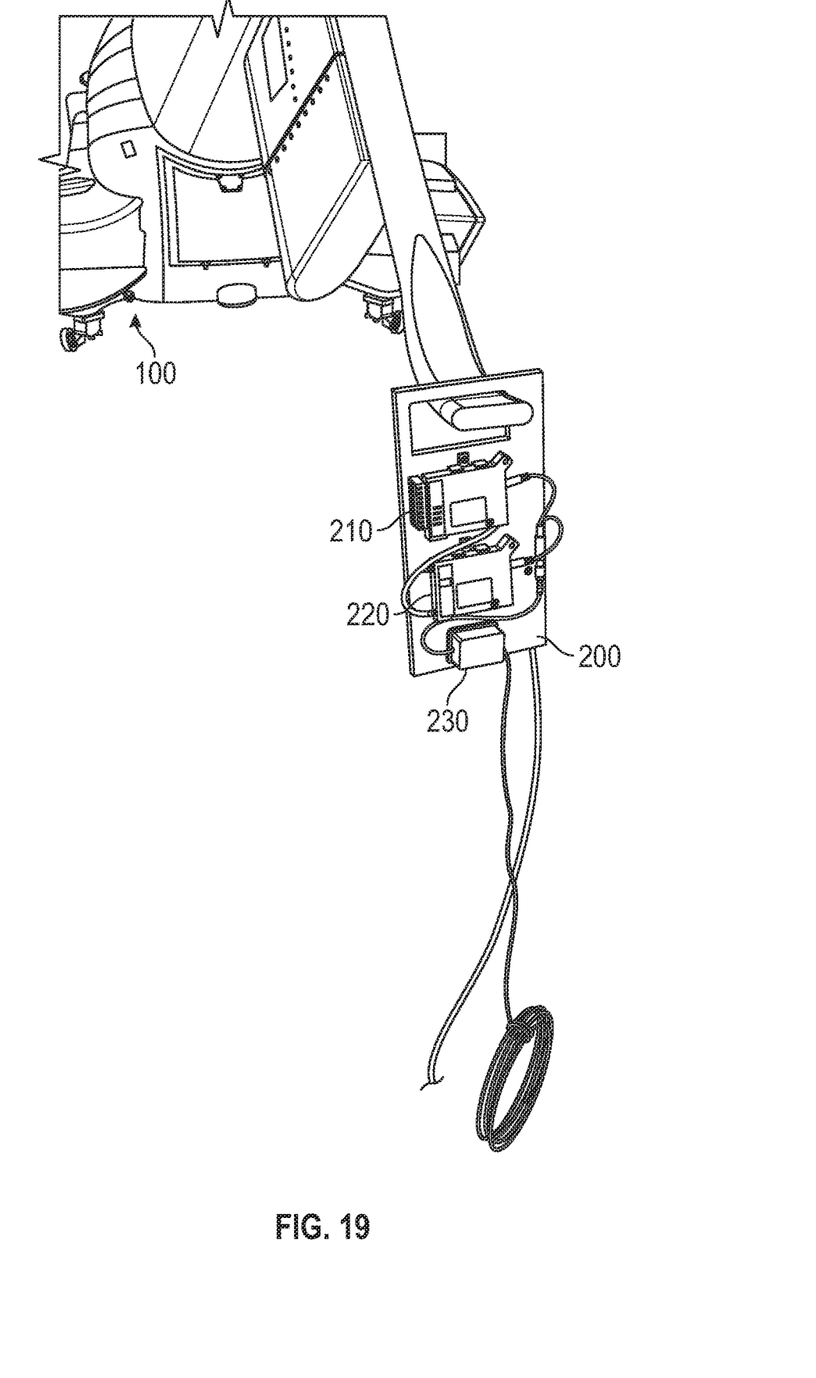
FIG. 19 is a perspective view of a telemetry system according to an exemplary embodiment of the present invention, disposed on an aircraft.

The next step in the installation process is to install the telemetry system 200. As noted above, the telemetry system 200 may include: (1) a first data logger 210 for logging temperature and relative humidity (rH) data, (2) a second data logger 220 for logging temperature and differential pressure data, (3) a wireless device server 230 which connects the first and second data loggers to a private network (e.g., Local Area Network (LAN)). As shown in FIG. 19, the telemetry system 200 may be mounted on a plastic board and hung on the tail skid/stinger of the aircraft. The dehumidifiers 30 should be positioned such that they do not blow directly onto the telemetry system 200.

Figure 20:
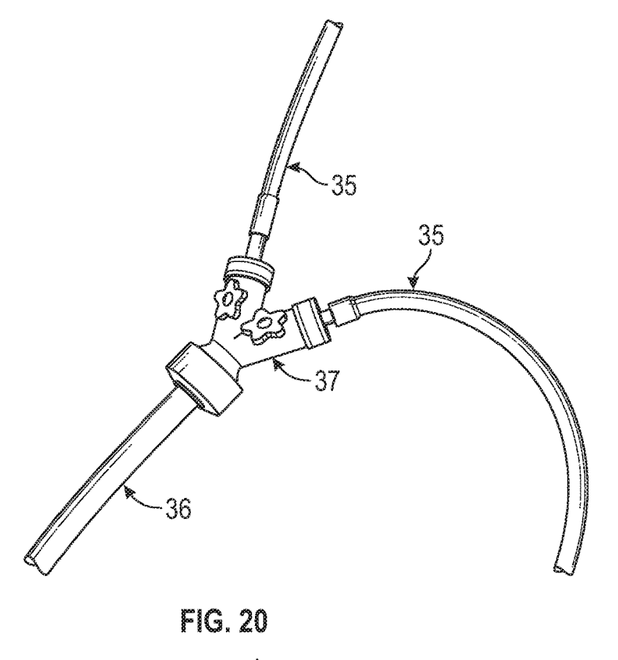
FIG. 20 is a perspective view of a coupling between dehumidifier drain lines and a common drain line according to an exemplary embodiment of the present invention.

Once the above installation in complete, the only remaining steps in the process involve making the cable connections. First, one must connect the dehumidifier water discharge hoses 35 (e.g., ⅜" hoses) to the water drain line 36 (e.g., ½" hose), as shown in FIG. 20. FIG. 20 shows two (2) such water discharge hoses 35, corresponding to the exemplary two (2) dehumidifiers 30. However, those of ordinary skill in the art will realize that any number of water discharge hoses and water drain lines may be utilized without departing from the scope of the present invention. The dehumidifiers 30 may each have a discharge pump and a check valve that permit them to discharge to a common hose, such as the water drain line 36. An adapter 37 may be used to connect the dehumidifier water discharge hoses 35 to a common drain hose 36, as shown in FIG. 20. The common drain hose 36 may then be run from inside the pod to the outside through the pass through whip 15, and to a suitable floor drain or sink (not shown).

Figure 21:
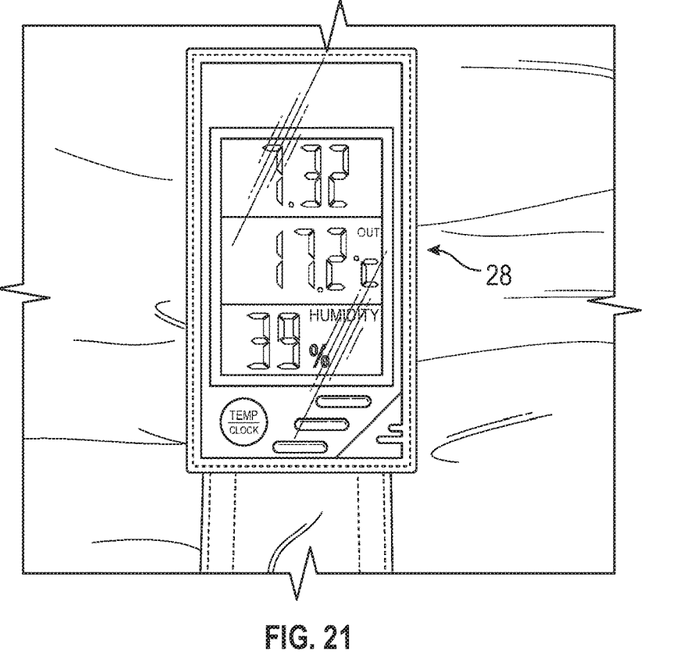
FIG. 21 is a perspective view of a an upper portion of an inflatable storage pod according to an exemplary embodiment of the present invention, showing a temperature and humidity readout.

Either the base portion 10 or the upper portion 20 of the pod may include an integral temperature and humidity readout 28, for human monitoring of the temperature and humidity within the pod. FIG. 21 shows the temperature and humidity readout 28 disposed on the upper portion 20 of the pod. However, the telemetry system 200 inside the pod is much more accurate, and may at times differ from the temperature and humidity readout 28 by approximately five (5) points in either direction.

Figure 22:
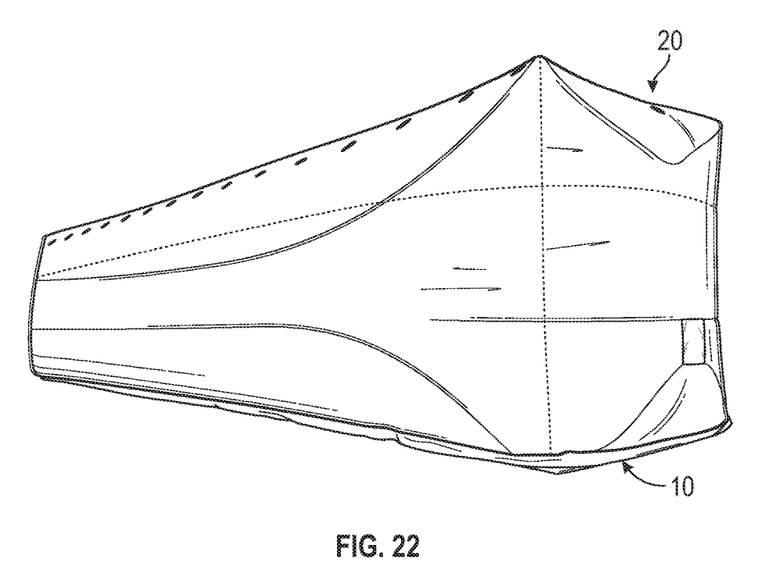
FIG. 22 is a perspective view of a base portion and an upper portion of an inflatable storage pod according to an exemplary embodiment of the present invention, fully inflated.

FIG. 22 shows a completed and inflated pod forming a Controlled Humidity Environment (CHE). A desired humidity level (e.g., less than 40% rH) may be maintained inside the pod through monitoring of the telemetry system 200, and corresponding adjustment of the dehumidifier(s) 30.

The telemetry system 200 according to an exemplary embodiment of the present invention operates as described below. As a condition of storage in the Controlled Humidity Environment (CHE), it is necessary to produce reports that confirm the humidity in the pod has been maintained below 45% relative humidity (rH), and preferably below 40% rH.

As discussed above, the telemetry system 200 includes at least two (2) data loggers 210, 220. The first data logger 210 monitors rH inside the pod and temperature inside the pod, and the second data logger 220 monitors differential pressure between the outside and inside of the pod, and temperature outside the pod.

The first and second data loggers 210, 220 may be self-powered and set to record data approximately every eight (8) seconds. They may also be set to average the data every fifteen (15) minutes, and record a data point. The data loggers 210, 220 may be programmed to overwrite stored data after approximately ninety (90) days. The data loggers 210, 220 may be set up and identified according to the location and serial number of the aircraft.

Data from the data loggers 210, 220 may be uploaded and viewed using monitoring software (e.g., ACR TrendReader®). Each storage location may be equipped with a local copy of the software which can be installed on a local computer (e.g., laptop, desktop, tablet) and used to download data from the data loggers 210, 220. The data loggers 210, 220 may be accessed by the local computer through the wireless device server 230 (e.g., ACR Wireless Device Server), either through a hard-wired cable connection to the wireless device server, or wirelessly through the private network (e.g., CHC Citrix network). Preferably, the data loggers 210, 220 are accessed wirelessly using the private network, which facilitates downloading of data from any computer connected to the Internet through a Virtual Private Network (VPN) connection. In order to have complete wireless operation, each storage base would require a WiFi connection with a dedicated Internet Protocol (IP) address for each wireless device server 230.

The wireless device server 230 may also have the ability to broadcast email alerts in the event that an alarm condition has occurred. Possible alarm conditions could include:
  Relative Humidity (rH) has exceeded a specified amount (e.g., 38%); and/or
  Differential Pressure (DP) has changed by a specified amount A buffer time (e.g., 2 minutes) between the alarm condition and the transmittal of the alarm notice may be assigned to eliminate transient false alarms. Email alerts may be broadcast to email distribution lists. Each distribution list may include, for example, the Fleet Director, applicable maintenance control, designated person(s) at the local base, and designated person(s) at a Central Monitoring Office (CMO). If an alarm condition exists, an email alert may be broadcast and repeated periodically (e.g., every thirty (30) minutes). This broadcast may continue until the data logger in the affected pod is accessed and the data uploaded, which will reset the alarm notification and suppress alarms for a preset period (e.g., twenty-four (24) hours). The alarm message will indicate which aircraft is experiencing the alarm condition with the message "Check Aircraft (a/c s/n)." For example, "Check Aircraft 9008". The alarm notification system may be tested by inserting a special test connector into the data logger and observing that the alarm notification has been received.

The data loggers 210, 220 may be tracked for calibration and maintenance using any commercially available maintenance tracking system. For example, Aircraft Maintenance Operating System (AMOS) from SwissAir may be utilized for this purpose. A spare set of data loggers may be assigned to rotate through each storage location, so that there is always a spare when performing maintenance or calibration activities.

During normal operating conditions, the data loggers 210, 220 are not programmed to continuously transmit data. Rather they must be periodically polled to obtain data. Since the data loggers 210, 220 will overwrite data every ninety (90) days, it is advisable for local base personnel to download data from the data loggers every thirty (30) days. This allows the local base to maintain accurate and current maintenance records for each aircraft. The local base personnel may arrange to download data from the pods, print the resulting graphs, archive a copy of the graph at the base, and forward a copy to the respective Fleet Director. Similarly, every thirty (30) days the designated person(s) at the Central Monitoring Office may arrange to download data from each storage location, and prepare charts using the monitoring software (e.g., ACR TrendReader®). This data may also be archived in a chart for future reference. The data may additionally be distributed to the respective Regional Maintenance Managers (RMMs) and Fleet Directors.

In the event of an Information Technology (IT) system failure, the designated person(s) at the Central Monitoring Office may advise the storage base that they have been unable to connect to the pod. The designated person(s) at the local base may then arrange a physical inspection of the pod to correct any deficiencies, and advise the designated person(s) at the CMO, whom can then confirm that they are able to access the system and pod again. If still unable to connect, the designated person(s) at the local base may use a local laptop equipped with the monitoring software (e.g., ACR TrendReader®), and connect directly to the data loggers with an interface cable (e.g., USB cable). The designated person(s) at the local base may also initiate an IT request to resolve the issue.

In the event of an alarm, the designated person(s) at the CMO may connect to the affected storage location and download data from the data loggers 210, 220, which may silence the alarm notification in some embodiments. The designated person(s) at the CMO then graphs the data for the affected pod, and determines what caused the alarm. The designated person(s) at the CMO may then advise the RMM and the designated person(s) at the local base to inspect the pod and resolve the issue. The designated person(s) at the local base may arrange for personnel to attend the pod with the alarm and correct the condition that is causing the alarm. The designated person(s) at the local base may then confirm with the designated person(s) at the CMO that the condition has been corrected. The designated person(s) at the CMO may then confirm correction by downloading data from the data loggers and reviewing the graph to confirm that storage conditions are met. Once storage conditions are confirmed at the CMO, this may be confirms with a high-level authority at the local base, such as the Senior Base Engineer (SBE).

In view of the foregoing detailed description of exemplary embodiments of the present invention, it readily will be understood by those persons skilled in the art that the present invention is susceptible to broad utility and application. While various aspects have been described in the context of standalone application, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention.

It should also be understood that, although steps of various processes may be shown and described as being in an exemplary sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to exemplary embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

What is claimed is:

1. An aircraft storage system comprising:
    a base portion;
    an upper portion which may be attached to the base portion to form a substantially sealed chamber in which an aircraft may be disposed;
    at least one dehumidifier disposed within the substantially sealed chamber;
    a telemetry system for monitoring atmospheric conditions both inside and outside the substantially sealed chamber; and,
    an inflation mechanism that is separate from the telemetry system,
    wherein said atmospheric conditions comprise the differential pressure between the inside and outside of the substantially sealed chamber.

2. The system of claim 1, further comprising:
    a first fastening means extending around the entire base portion; and
    a second fastening means extending around the entire upper portion,
    such that the base portion may be joined to the upper portion to form the substantially sealed chamber using the first and second fastening means.

3. The system of claim 2, wherein the first and second fastening means comprise two sides of a zipper.

4. The system of claim 1, further comprising:
    at least one fan disposed within and integral with the upper portion, said fan operable to inflate the substantially sealed chamber.

5. The system of claim 1, wherein said aircraft comprises a helicopter.

6. The system of claim 1, further comprising:
    a pass through whip disposed in one of the base portion or the upper portion, said pass through whip operable to route hoses and wires from inside of the substantially sealed chamber to the outside.

7. The system of claim 1, wherein said at least one dehumidifier disposed within the substantially sealed chamber comprises at least two dehumidifiers disposed within the substantially sealed chamber.

8. The system of claim 1, wherein said telemetry system further comprises:
    a first data logger;
    a second data logger; and
    a wireless device server which connects the first and second data loggers to one or more computer networks.

9. The system of claim 1, wherein said telemetry system operates to maintain a specific relative humidity (rH) level within the substantially sealed chamber.

10. The system of claim 1, wherein said telemetry system operates to maintain relative humidity (rH) level below 45% within the sealed chamber.

11. The system of claim 8, wherein said first data logger monitors relative humidity (rH) within the substantially sealed chamber.

12. The system of claim 11, wherein said first data logger additionally monitors temperature within the substantially sealed chamber.

13. The system of claim 8, wherein said second data logger monitors the differential pressure between the outside and inside of the substantially sealed chamber.

14. The system of claim 13, wherein said second data logger additionally monitors temperature outside the substantially sealed chamber.

15. The system of claim 1, wherein said telemetry system provides an alarm when a specific atmospheric condition is satisfied.

16. The system of claim 15, wherein said telemetry system provides an alarm when relative humidity (rH) within the substantially sealed chamber exceeds 38%.

17. The system of claim 15, wherein said telemetry system provides an alarm when the differential pressure between the outside and inside of the substantially sealed chamber changes by a specified amount.

18. A method for controlling atmospheric conditions around an aircraft, comprising the steps of:
    disposing the aircraft on a base portion of a storage chamber;
    disposing at least one dehumidifier on the base portion near the aircraft;
    disposing a telemetry system near the aircraft;
    disposing an upper portion of the storage chamber overtop of the aircraft;
    securing the base portion to the upper portion to form a substantially sealed chamber surrounding the aircraft;
    inflating the substantially sealed chamber utilizing an inflation mechanism that is separate from the telemetry system; and
    monitoring the relative humidity (rH) around the aircraft and within the substantially sealed chamber using the telemetry system;

monitoring the differential pressure between the inside and outside of the substantially sealed chamber using the telemetry system; and, modifying the output of the at least one dehumidifier based on the measured relative humidity (rH), so as to maintain a specific relative humidity (rH) level within the substantially sealed chamber surrounding the aircraft.

19. The method of claim 18, wherein said step of modifying the output of the at least one dehumidifier based on the measured relative humidity (rH) comprises modifying the output of the at least one dehumidifier when relative humidity (rH) within the substantially sealed chamber exceeds 38%.

20. The method of claim 18, wherein said step of monitoring the relative humidity (rH) around the aircraft using the telemetry system comprises monitoring said relative humidity (rH) using a first data logger.

21. The method of claim 20, comprising the further steps of:

monitoring a temperature inside the substantially sealed chamber surrounding the aircraft using the first data logger;

monitoring the differential pressure between the inside and outside of the substantially sealed chamber using a second data logger; and, monitoring a temperature outside the substantially sealed chamber surrounding the aircraft using the second data logger.

* * * * *